INVENTOR
JOHN E. ULLMAN

United States Patent Office 3,395,694
Patented Aug. 6, 1968

3,395,694
ADHESIVE HEATING APPARATUS
John E. Ullman, Huntingdon Valley, Pa., assignor to Huntingdon Incorporated, Bethayres, Pa., a corporation of Pennsylvania
Filed Oct. 22, 1965, Ser. No. 501,323
11 Claims. (Cl. 126—343.5)

ABSTRACT OF THE DISCLOSURE

Adhesive heating apparatus comprising a hopper adapted to receive an adhesive in solid form, a grid positioned in the hopper for supporting the solid adhesive, hot transfer fluid means for heating the grid to melt the adhesive into liquid form and pass it downwardly through the grid, a basin positioned beneath the grid for receiving and storing the liquid adhesive, said basin including an outer and inner jacket with a jacket space therebetween, a sump formed in the basin, a submersible pump mounted in the sump and adapted to be submerged by the liquid adhesive and heated thereby, a hot transfer fluid in the jacket space for heating the liquid adhesive in the basin to a desired pumping temperature, a number of hot adhesive lines extending from the pump and adapted to be connected to adhesive applicators, a line containing a hot transfer fluid positioned in the adhesive lines to heat the adhesive therein, and grid control means operating in response to liquid adhesive level in the basin for turning the grid heating means on and off, said grid control means including a float which rides in the basin adhesive and operates a control valve in a fluid line which feeds hot fluid to the grid to heat it.

The apparatus also includes a collector pan positioned beneath the grid for catching the melted adhesive when the grid heating means is turned off. The collector pan is provided with a stop valve adapted to hold the adhesive in the collector pan. The stop valve is controlled by means operating in response to liquid adhesive level in the basin so that when the liquid reaches a pre-determined level the stop valve is closed.

A heat baffle pan and screen is positioned between the collector pan and the basin for inhibiting passage of heat from the basin to the grid, thereby preventing unwanted melting of the adhesive when the grid is turned off. The screen catches any foreign matter as the liquid adhesive passes through the screen from the collector pan to the basin.

---

This invention relates to adhesive heating apparatus, and more particularly concerns a hot melt system for heating and melting a solid adhesive and supplying it to one or more applicators in hot, melted condition. The hot adhesive is adapted to be applied by the applicators to the flaps of, for example, paperboard boxes, cases, trays, cartons, and other packages, which are being sealed in a high speed sealing machine.

Although it has heretofore been suggested to provide adhesive heating apparatus for case sealing machines, the adhesive in such apparatus was subject to being overheated because of hot spots with subsequent degradation of adhesive or under-heated because of cold spots in the system with subsequent lack of application control.

Accordingly, it is an object of this invention to provide adhesive heating apparatus which overcomes the foregoing problem by eliminating hot and cold spots.

It is another object to provide adhesive heating apparatus which maintains a reservoir of hot adhesive automatically.

Other object and advantages of this invention, including its simplicity and economy, as well as the ease with which it may be adapted to existing equipment, will further become apparent hereinafter and in the drawings in which.

Figure 1:
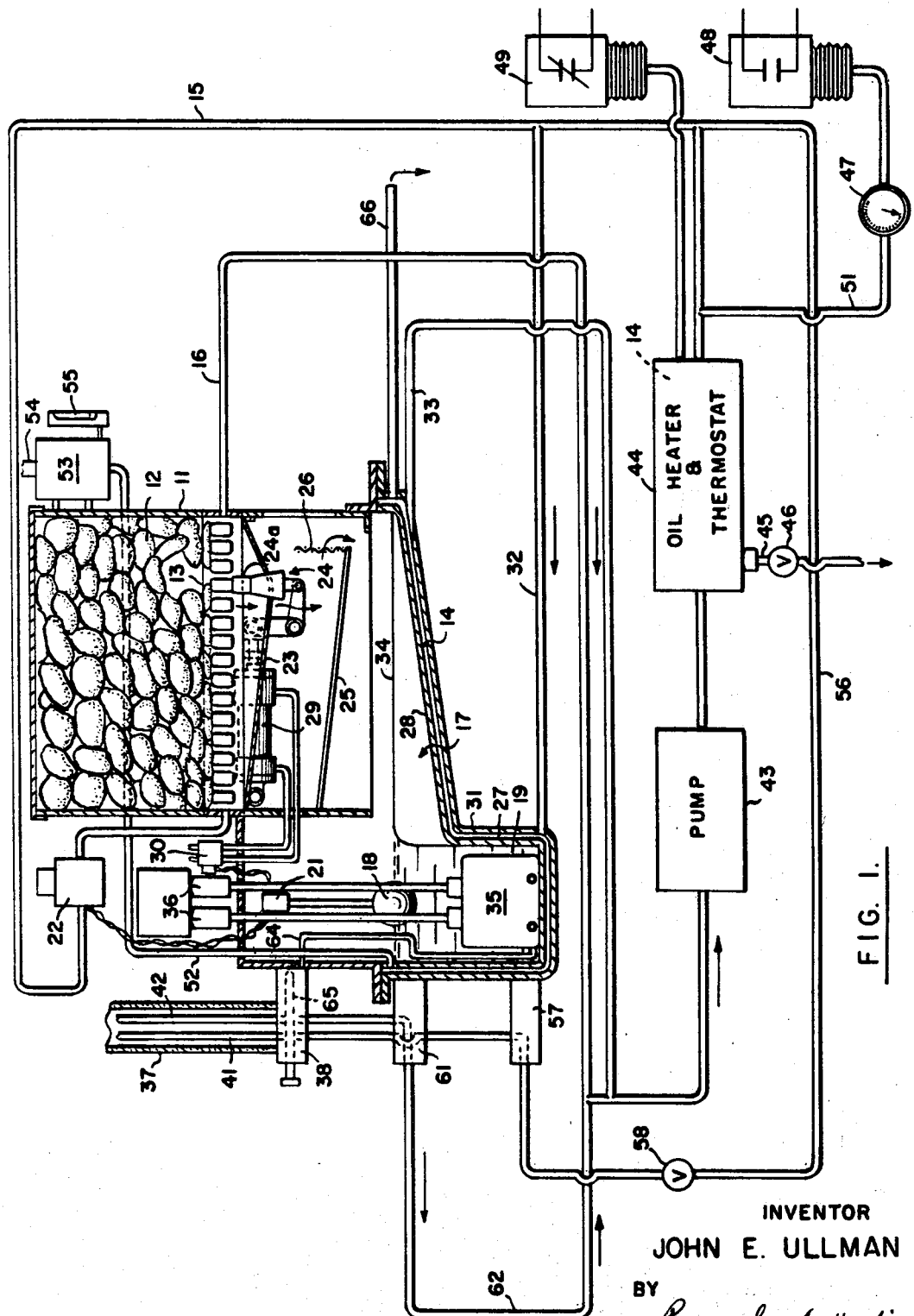
FIG. 1 is a view, partly in section and partly schematic, of adhesive heating apparatus constructed in accordance with this invention.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown adhesive heating apparatus which comprises a hopper 11 that is adapted to receive a solid adhesive 12 which may be in any form such as chunks, slugs, slabs, pellets, and rods.

A grid 13 is positioned in hopper 11 and supports solid adhesive 12. Means are provided for heating grid 13 in order to melt the adhesive 12 into liquid form and pass it through the grid. The grid heating means is a hot fluid 14, such as one of the heat-transfer fluids commercially available, which passes into grid 13 through a fluid feed line 15 and passes from grid 13 through a fluid return line 16.

A basin 17 is positioned below grid 13 for receiving and gradually heating the liquid adhesive to proper pumping temperature.

Grid control means are provided for automatically turning the grid heating means on and off in response to the level of adhesive in basin 17. The grid control means includes a float 18 which rides in the molten adhesive and operates, through limit switch 21, a control valve 22 which is positioned in fluid feed line 15. When the level of molten adhesive reaches a low level, control valve 22 passes hot fluid through feed line 15 into grid 13 to heat it and thereby melt solid adhesive 12. When the molten adhesive level is high enough, the control valve 22 is automatically turned off by switch 21 to stop the passage of hot fluid 14 through feed line 15 into grid 13 and to stop the melting of solid adhesive 12 when grid 13 cools.

Since solid adhesive 12 continues to melt even after fluid feed line 15 is turned off until grid 13 reaches a temperature below the melting point of the solid adhesive, a collector pan 23 having an adhesive stop valve 24 is positioned beneath grid 13 and is adapted to catch and hold the melted adhesive which passes through grid 13 after control valve 22 has been turned off in response to the adhesive level in basin 17. Adhesive stop valve 24 has a valve plug 24a which seats in a valve port to close the valve and stop the passage of the melted adhesive through pan 23. Plug 24a is moved downwardly to its unseated position to pass the melted adhesive through the valve port. Valve 24 may be air operated in response to the position of float 18, as by a double-acting air cylinder 29 that is controlled by a 4-way solenoid valve 30 that is operated by the float-actuated limit switch 21.

When valve 24 is closed, the upper end of valve plug 24a contacts grid 13. This has the advantage of heating plug 24a so as to melt any adhesive around it in pan 23 to prevent the valve plug 24a from sticking.

In order to inhibit the passage of heat from the hot liquid adhesive in basin 17 to grid 13 and thereby prevent unwanted melting of solid adhesive 12 when grid 13 is not being heated, a heat baffle pan 25 and screen 26 is positioned beneath collector pan 23. Baffle pan 25 inhibits the upward passage of heated air, and screen 26 catches any foreign matter as the liquid adhesive passes from collector pan 23 to basin 17.

Means are provided for heating basin 17 which includes hot fluid 14 which is fed into a space 27 formed between basin inner jacket 28 and basin outer jacket 31. The hot fluid 14 is fed into space 27 through fluid feed line 32 and is passed out of space 27 through fluid return line 33. Inner jacket 28 is provided with a number of upwardly extending fins 34 which extend into the liquid adhesive in the basin 17 for better transfer of heat thereto from the hot fluid 14 in jacket space 27.

A pump 35 is submerged in the liquid adhesive in a sump portion 19 of basin 17 and is adapted to pump the adhesive out of the sump. Pump 35 may be operated by reciprocating double-acting air cylinders 36.

Figure 2:
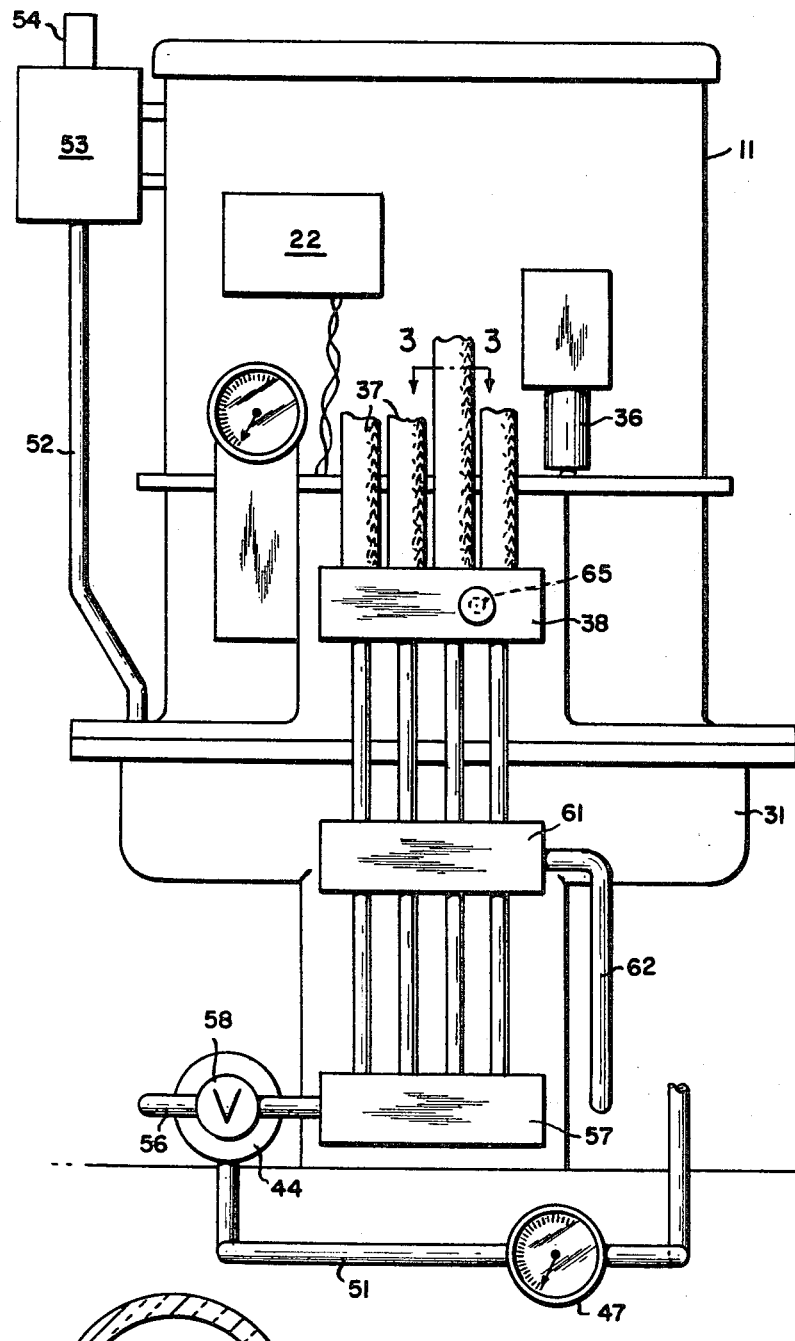
FIG. 2 is a view in side elevation of the adhesive heating apparatus looking from the left of FIG. 1.
Figure 3:
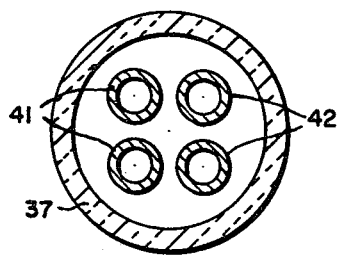
FIG. 3 is a view in section taken as indicated by the lines and arrows 3—3 which appear in FIG. 2.

An adhesive line 64 extends from pump 35 to a hot adhesive manifold 38, and a number of hot adhesive lines 37 extend from manifold 38 to adhesive applicators, such as the spray guns of a case sealer machine. Four lines 37 are shown in FIG. 2, but there may be any number of lines. Means are provided for heating the adhesive in lines 37, and the line heating means include a pair of hot fluid feed lines 41 which are positioned within each hot adhesive line 37 and extend along its length. A pair of hot fluid return lines 42 are also positioned within each hot adhesive line 37 and extend along the length of the adhesive line.

The hot fluid system includes a circulating pump 43 which pumps the fluid to a fluid heater 44 which has a thermostat to control the working temperature of the fluid. Another thermostat 49 acts as a safety device which automatically shuts off heater 44 if the fluid temperature exceeds a maximum safe temperature. A drain 45 extends from heater 44 and has a drain valve 46.

The pressure of the fluid in the system is indicated by a pressure gauge 47. A pressure switch 48 shuts the entire fluid system down if the pressure of the fluid drops below a predetermined value. The fluid is fed to gauge 47 and switch 48 from oil heater 44 through a fluid line 51.

The heating system for grid 13 extends from fluid heater 44 to grid 13 through fluid feed line 15 which has control valve 22 positioned therein, and returns to oil heater 44 through fluid return line 16 and circulating pump 43.

The heating system for basin 17 extends from heater 44 through fluid feed line 32 into jacket space 27, and returns to heater 44 through return line 33 and pump 43.

To prevent the buildup of pressure in jacket space 27, a fluid line 52 extends from jacket space 27 to an expansion tank 53 having a vent 54 and a sight tube 55 which indicates the level of the fluid within expansion tank 53. Expansion tank 53 allows the fluid in the system to expand and contract and prevents the buildup of pressure or vacuum in the system. The fluid in the expansion tank replenishes any fluid in the system which may be lost because of leakage.

The fluid system is a vented, closed system and tank 53 vents it to atmosphere. The fluid is subject to degradation if exposed to the atmosphere at elevated temperature. However, the fluid is at room temperature in the expansion tank so that degradation is avoided.

The heating system which heats adhesive lines 37 extends from fluid heater 44 through fluid line 56 to manifold. 57. A valve 58 is positioned in fluid line 56 and can be used to manually shut off the flow of hot fluid in that line for maintenance or during a standby period where it may be desirable to keep the sump heated but the lines 37 not heated, in order to work on them, etc. The fluid passes from manifold 57 through feed lines 41 in adhesive lines 37 adjacent to the applicators and returns from the applicators through return lines 42 to manifold 61. Then the fluid returns to heater 44 through fluid return line 62 and circulating pump 43.

The liquid adhesive system includes an adesive line 64 through which the hot adhesive is pumped from sump 19 of basin 17 by pump 35 to manifold 38 and through hot adhesive lines 37 to the adhesive applicators. A bypass needle valve 65 extends between manifold 38 and basin 17 so that the adhesive may be returned directly to basin 17 from manifold 38 when desired.

In operation, the solid adhesive 12 is placed in hopper 11 and is supported on grid 13. The grid is heated by hot fluid 14 and the adhesive melts. The melted adhesive drips onto collector pan 23 where it passes through glue stop valve 24 onto baffle pan 25 and then through screen 26 into basin 17. The temperature of the liquid adhesive in basin 17 is gradually increased by fins 34 as it passes therealong toward pump 35. The pump forces the hot adhesive into manifold 38 through adhesive line 64. From manifold 38 the hot adhesive passes through adhesive lines 37 to the applicators. While in lines 37, the adhesive is heated by the hot fluid in lines 41 and 42.

When the liquid adhesive in basin 17 reaches the desired level, float 18 actuates switch 21 to shut off control valve 22 and stop the feeding of hot liquid to grid 13 through fluid line 15. Glue stop valve 24 closes so that collector pan 23 catches any adhesive which may melt while the grid 13 is cooling to a temperature below the melting point of the solid adhesive. This is especially important when adhesive having a low melting point is being used. When the liquid adhesive level in basin 17 lowers, float 18 lowers and actuates switch 21 to open control valve 22 and feed hot fluid to grid 13 through fluid line 15. Glue stop valve 24 opens and passes the melted adhesive downwardly to baffle pan 25 and screen 26 to basin 17.

The adhesive heating apparatus of the present invention has many advantages. Hopper 11 may be made any size and has a capacity which is practically unlimited. Accordingly, hopper 11 need not be filled very often and this saves labor.

In previous devices, a quantity of cold solid adhesive was placed in melter and the entire mass was melted and gradually fed to the adhesive applicators. When the melter was partly empty of liquid adhesive, another supply of cold adhesive was added and melted. During this melting period, if the level of melted adhesive had been too low before replenishment, the sealing machine would have to be shut down until cold adhesive was added and melted to the proper temperature. In the present invention, the sealing machine does not have to shut down because a continuous supply of liquid adhesive is available from sump 19 of basin 17 and melt grid 13. The addition of cold adhesive to hopper 11 does not lower the temperature of the liquid adhesive in sump 19 at pump 35. The gradual passage of the melted adhesive from grid 13 to pump 35 in intimate contact with heated fins 34 gradually heats the adhesive to the desired temperature for pump 35.

In the present invention, degradation of the adhesive is eliminated. The adhesive is melted as needed and only a relatively small quantity of liquid adhesive is maintained in basin 17 and it is maintained at a temperature which is well below the temperature at which it will degrade or at which it is applied. As the liquid adhesive flows through fins 34 and adhesive lines 37 it absorbs heat and its temperature gradually increases to approach application temperature. The adhesive applicators are automatically maintained precisely at application temperature and only at the applicator does the adhesive reach that temperature. Thus, overheating of the adhesive is eliminated.

Pump 35 is air driven and requires no attention other than the lubrication of the pneumatic mechanism. Even if this pump is stalled for an indefinite period of time, there is no damage to the pump. Accordingly, no interlocking controls are necessary to insure that the adhesive has melted to a desired viscosity before pumping begins. The pump is self compensating as to speed and as to pumping demand. The only control required is a pressure regulator for adjusting the pressure of the hot molten adhesive as required for application quantity and speed. Pump 35 is a submersible type and is located in sump 19 of basin 17 and operates at the temperature of the hot melt adhesive and is heated to the proper pumping temperature by the adhesive itself.

The intake of the pump 35 is close to the bottom of sump 19 and the pump removes almost all adhesive from the sump when the system is being cleaned. Also during operation there are no dead spots where the adhesive could remain stagnant for long periods of time and degrade.

Warm-up time of the adhesive heating apparatus is considerably less than prior apparatus, and may be as low as 15 minutes as compared to about one hour or more for previous equipment.

The fluid used in the heating apparatus of the present invention may be one of several heat-transfer fluids.

Basin 17 is equipped with an overflow pipe 66 which permits the liquid adhesive in sump 17 to overflow if its level gets too high in case of failure of the float 18, switch 21 or valve 22.

Another fail-safe feature is that valve 22 is normally closed and must be actuated by switch 21 to assume its open position. Accordingly, failure of switch 21 shuts valve 22 and stops the feeding of fluid to grid 13.

It is to be understood that the form of the invention herewith shown and described is to be taken as a presently preferred embodiment. Various changes may be made in the shape, size and arrangement of parts. For example, equivalent elements may be substituted for those illustrated and described herein, parts may not be reversed, and certain features of the invention may be utilized independently of the use of other features, all without departing from the spirit or scope of the invention as defined in the subjoined claims.

What is claimed is:

1. Adhesive heating apparatus comprising a hopper adapted to receive and store an adhesive in solid form, a grid positioned in the hopper which supports the solid adhesive, means for feeding a hot transfer fluid to the grid to melt the adhesive into liquid form and pass it through the grid, a basin positioned beneath the grid for receiving and gradually heating the liquid adhesive to a desired pumping temperature, control means for automatically stopping the flow of hot transfer fluid to the grid in response to the level of liquid adhesive in the basin, and thermostatic means for controlling the temperature of the hot transfer fluid.

2. The apparatus of claim 1 wherein said grid control means includes a float which rides in the basin adhesive and operates a control valve in a fluid line which feeds hot fluid to the grid to heat it.

3. The apparatus of claim 1 wherein a pump is submerged in the liquid adhesive in the basin, and air means is provided for operating the pump, whereby the pump is self-compensating as to speed and pumping demand.

4. The apparatus of claim 1 including a hot adhesive line extending from the basin and adapted to be connected to an adhesive applicator, and means for gradually heating the adhesive to application temperature.

5. The apparatus of claim 1, said basin including an outer and inner jacket with a jacket space therebetween and having a sump formed therein for receiving and storing the liquid adhesive, a pump mounted in the sump and adapted to be submerged by the liquid adhesive and heated thereby, means including hot transfer fluid in the jacket space for heating the basin to a desired temperature, a hot adhesive line extending from the pump and adapted to be connected to an adhesive applicator, and a line containing hot transfer fluid positioned within the adhesive line to heat the adhesive therein.

6. The apparatus of claim 5, including a fluid line extending from said jacket space to an expansion tank, whereby the fluid in the system is allowed to expand and contract and to thereby prevent the build-up of pressure or vacuum in the system, and a vent extending from the expansion tank.

7. The apparatus of claim 5, including a bypass valve positioned in the hot adhesive line extending from the pump and adapted to return the adhesive from the pump directly to the sump.

8. The apparatus of claim 5 wherein the inner jacket has fins extending into the adhesive for better transfer of heat thereto.

9. Adhesive heating apparatus comprising a hopper adapted to receive an adhesive in solid form, a grid positioned in the hopper which supports the solid adhesive, means including a hot transfer fluid for heating the grid to melt the adhesive into liquid form and pass it through the grid, a basin positioned beneath the grid for receiving and gradually heating the liquid adhesive to a desired pumping temperature, a collector pan having an adhesive stop valve adapted to catch and hold the melted adhesive when the grid heating means is turned off in response to the adhesive level in the basin so as to not increase that level, and means operating in response to liquid level for controlling the stop valve such that when the liquid reaches a predetermined level the stop valve is actuated to close the collector pan.

10. The apparatus of claim 9 including a heat baffle pan and screen positioned between the collector pan and the basin for inhibiting passage of heat from the basin to the grid and thereby preventing unwanted melting when the grid is unheated, and for catching foreign matter as the liquid adhesive passes from the collector pan to the basin.

11. A hot melt system for heating and melting a solid adhesive and supplying it to an applicator in hot, melted condition, comprising a hopper for receiving solid chunks of adhesive, a melt grid positioned in the hopper and adapted to receive and melt the adhesive, a collector pan beneath the grid for receiving the melted adhesive, an adhesive stop valve mounted in the collector pan adapted to pass the adhesive when open and to stop passage when closed, means operating in response to liquid level for controlling the stop valve such that when the liquid reaches a predetermined level the stop valve is actuated to close the collector pan, a basin beneath the collector pan for receiving the melted adhesive, a heat baffle pan positioned between the basin and collector pan for inhibiting the passage of heat from the basin to the grid to prevent unwanted melting of the adhesive when the grid is unheated, a screen mounted on the baffle pan to catch foreign matter as the melted adhesive passes from the baffle pan to the basin, a pump positioned in a sump in the basin, a hot adhesive line extending from the pump and adapted to be connected to an adhesive applicator, a heating system for supplying heat to the grid, to the adhesive in the sump, and to the hot adhesive line in said heating system, including a heat transfer fluid system having a pump for pumping a heat transfer fluid, a heater for heating the fluid to a desired temperature, a fluid feed line extending from the heater to the grid for heating the grid, said basin having an inner and outer jacket with a space therebetween, a fluid feed line extending from the heater to the jacket space for heating the adhesive in the basin, a fluid feed line extending from the heater to and inside the hot adhesive line for heating the adhesive therein, return fluid lines running from the grid, jacket space, and adhesive line to the fluid pump, and grid control means for turning the melt grid on and off in response to the level of the adhesive in the basin, said grid control means including a float which rides in the basin adhesive and operates a control valve in the fluid line that feeds the grid.

References Cited

UNITED STATES PATENTS

| | | | |
|---|---|---|---|
| 1,694,806 | 12/1928 | Yale. | |
| 2,360,665 | 10/1944 | Fields | 126—343.5 |
| 2,648,264 | 8/1953 | Green | 126—343.5 X |
| 2,969,894 | 1/1961 | Reustle | 126—343.5 X |
| 3,032,635 | 5/1962 | Kraft | 126—343.5 X |

FOREIGN PATENTS 458,785   12/1936   Great Britain.

CHARLES J. MYHRE, *Primary Examiner.*